UNITED STATES PATENT OFFICE.

HENRY GEORGE TYER, OF ANDOVER, MASSACHUSETTS.

COMPOSITION FOR SOLES AND HEELS OF SHOES AND BOOTS, VENEERS, PACKING, AND OTHER PURPOSES.

Specification forming part of Letters Patent No. 26,309, dated November 29, 1859.

*To all whom it may concern:*

Be it known that I, HENRY GEORGE TYER, of Andover, in the county of Essex and State of Massachusetts, have invented a new and useful Composition for Boot Heels and Soles, Veneers, Packing, and other Purposes; and I do hereby declare that the following is a full, clear, and exact description of the same.

My invention consists of a new and useful composition made of vulcanized india-rubber, leather, and gutta-percha in the proportions and manner hereinafter set forth.

To enable others to manufacture my invention, I will proceed with a statement of the proportions of the several ingredients and the process of manufacture.

I take of leather scraps, cuttings, parings or chips—such as may be obtained from shoemakers or other manufacturers of leather goods—eight (8) pounds; old vulcanized india-rubber, (preferably that which has combined with it a certain amount of fibrous material, as worn-out overshoes, belting, or hose,) two (2) pounds; and raw gutta-percha two (2) pounds, and proceed as follows, to wit: I first reduce the leather and india-rubber separately to powder, or to a finely-granulated state, by passing it between the rollers of an ordinary india-rubber mill, the rollers being either cold or heated, or by any other means. I then pass the india-rubber and gutta-percha together repeatedly between the rollers of the india-rubber mill, keeping the rollers heated to a temperature of about 200° Fahrenheit until they are thoroughly incorporated. I afterward add the pulverized granulated leather and pass the whole repeatedly between the rollers to knead and masticate the substances together until they are thoroughly combined. The composition may then, while hot, be pressed into molds or dies of any desired form by a hydraulic or other press, or be rolled into sticks or sheets by passing it between grooved, plain, or engraved rollers, or it may be pressed into blocks by direct pressure and sawed into thin sheets suitable for veneers or other purposes, or cut by other tools, or turned in a lathe, to any desired form, and is capable of having a fine natural polish produced upon it by friction.

The properties developed by the several ingredients of the composition are as follows, to wit: The leather gives body and solidity, the india-rubber gives a moderate degree of flexibility and elasticity, the gutta-percha binds the whole together and gives it tenacity; and if the india-rubber contains any fibrous substance that gives increased tenacity.

This composition is an excellent and durable material for the heels of boots and shoes, also for the inner soles thereof. It also makes an excellent air and water tight packing for the joints of pipes or tanks, and can be used for most of the purposes for which pure gutta-percha has been used, with the advantage of greater solidity; and it can be manufactured for a small fraction of the cost of gutta-percha, as the leather that is used is what is now commonly thrown away as waste; and old vulcanized rubber goods can be obtained for about one cent per pound.

So far as I am aware it has not heretofore been practicable with economy to put the worn-out or cast-away pieces of vulcanized rubber—such as old overshoes, springs, pipes, and other articles—to any useful purpose. After having been used long enough to injure them such articles are thrown away, as the material of which they are composed cannot be economically recast or devulcanized. By my improvement all cast-off vulcanized rubber may be immediately and cheaply applied to highly useful and valuable purposes. In many cases my composition may be employed in lieu of hand-rubber, as the cost of manufacture and molding is much less. In consequence of the strength and stiffness imparted to my composition by the leather it can be used also in cases where gutta-percha would be inadmissible, particularly in various articles of ornamental furniture, and can be freely operated upon by a whip-saw, file, or other tool. By pressure it becomes of any required hardness and solidity, and in that condition requires a much higher degree of temperature than gutta-percha to soften it, which in some cases is a great disadvantage. It may be substituted for "hard rubber" in many instances, for walking-canes, buttons, boxes and cases, &c. My composition, with the exception of the fiber, being nearly indestructible, unless by fire, is consequently admirably adapted for underground water-pipes, leaders, &c., at a very cheap rate. It possesses a decided advantage over other compounds in saving of time and expense in tools, dies, and other implements, not forgetting the heater, steam, and fuel. For example, many of the articles manufactured in hard rubber are first formed in expensive and costly dies, remaining therein during the whole vulcanizing process, (many hours,) one die for each article; but by the use of my composition many hundreds may be turned out from the one die in the same period of time, and they are at once ready for the lathe, or for polishing or varnishing. Again, in after use it is not near so brittle as hard rubber, or so easily defaced as gutta-percha.

I am aware that the mixture of various substances with india-rubber prior to vulcanization is common, and that is not claimed by me; nor do I claim broadly the admixture of leather with gutta-percha; but,

Having thus described my invention, what I claim as new, and desire to secure by Letters Patent, is—

A composition made of vulcanized india-rubber, leather, and gutta-percha in the proportions and manner herein set forth.

HENRY G. TYER.

Witnesses:
    JOHN TROW,
    EDWIN JAQUITH.